United States Patent Office 2,776,119
Patented Jan. 1, 1957

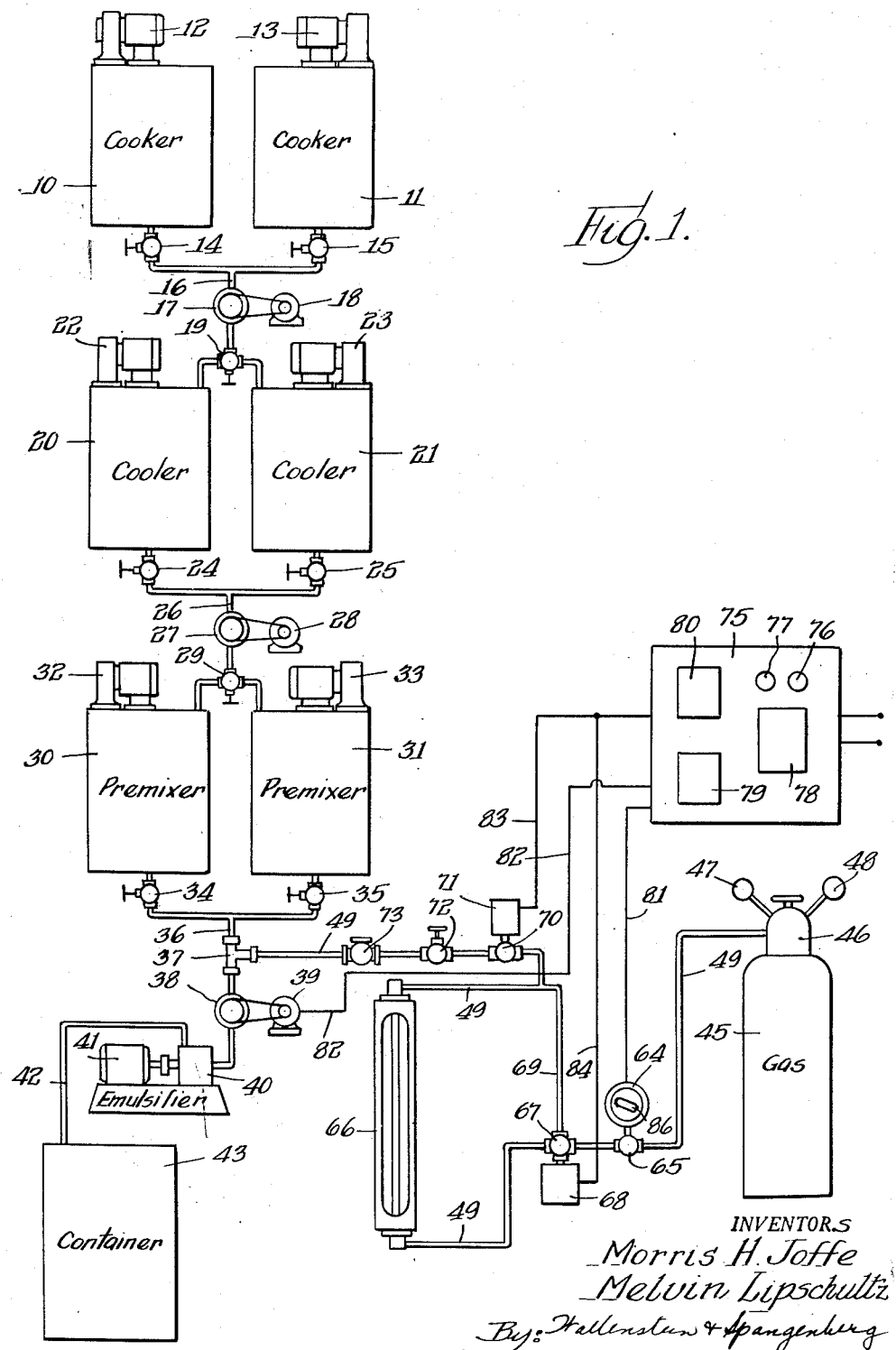

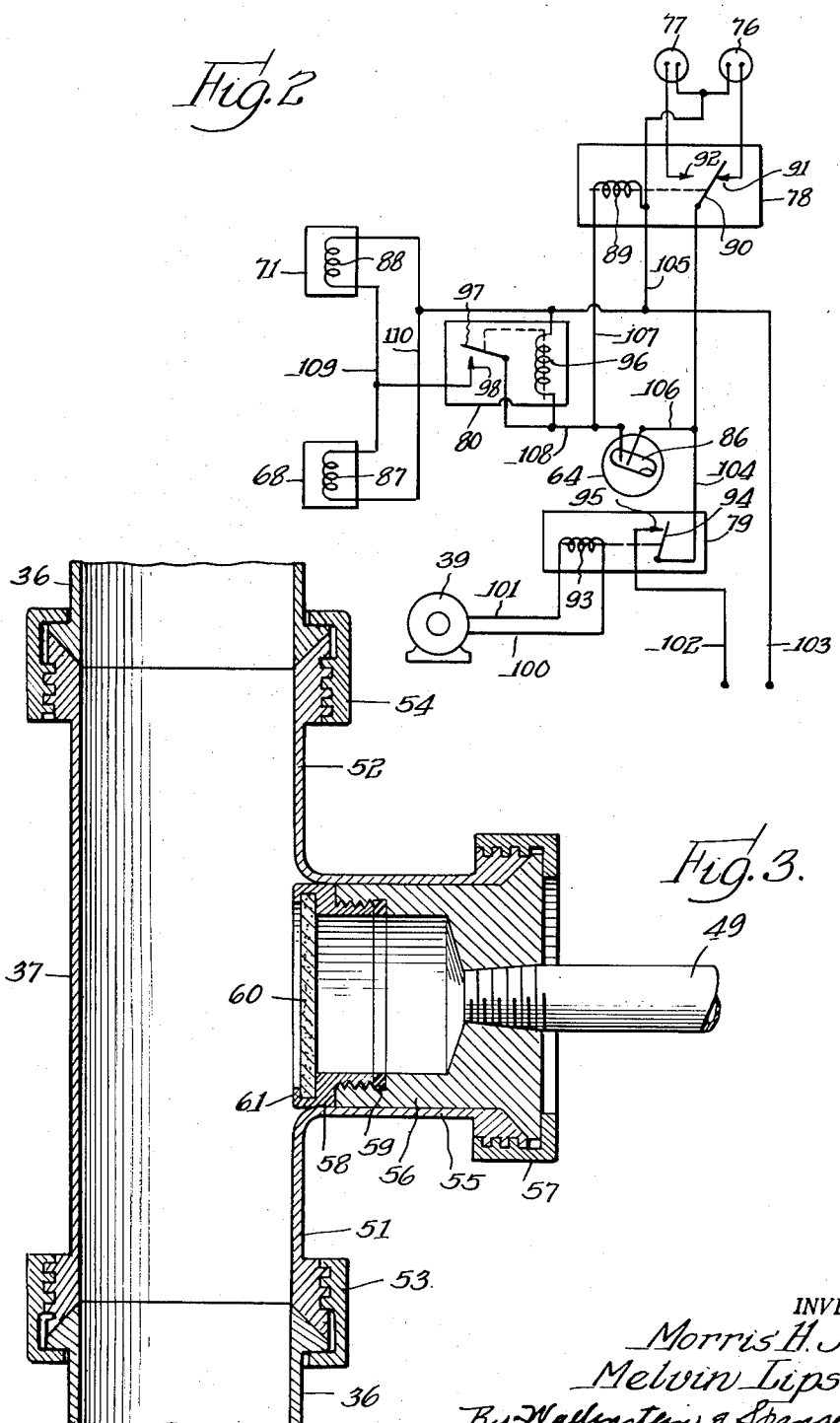

2,776,119

APPARATUS FOR PRODUCING DRESSING

Morris H. Joffe and Melvin Lipschultz, Chicago, Ill., assignors to The Emulsol Egg Products Corporation, Chicago, Ill., a corporation of Illinois Application April 22, 1953, Serial No. 350,405

11 Claims. (Cl. 259—4)

This invention relates to a method and apparatus for producing a dressing such as salad dressing, mayonnaise dressing or the like.

In the production of such dressings the usual required ingredients are assembled and premixed in a container, commonly referred to as a premixer, the ingredients for mayonnaise dressing usually consisting of eggs, oil, vinegar and seasoning in desired proportions. In the case of salad dressing a starch base is suitably cooked in a cooker, then transferred to a cooler for cooling the same and then transferred into a premixer along with desired proportions of eggs, oil, vinegar and seasoning where the ingredients are premixed and blended. The resulting mixture of the required ingredients is then transferred from the premixer through a mixture conduit at a substantially constant rate in a flowing stream to an emulsifying apparatus such as a colloid mill or the like. An inert gas such as nitrogen or carbon dioxide or the like is introduced into the mixture in the flowing stream path in the mixture conduit, whereby the combined mixture and gas are treated in the emulsifier apparatus to complete the emulsion. The emulsion is then transferred to a container or hopper of a jar filling machine or the like. Preferably the foregoing process is carried on in a continuous or semi-continuous manner for maximum production purposes. The introduction of the inert gas into the mixture results in the production of a very fine dressing having desirable physical characteristics and texture, having no separation and hence long shelf life, and having long keeping qualities. Such a method and apparatus for producing dressings are generally disclosed in Epstein et al. Patent No. 1,949,791 granted March 6, 1934.

The foregoing method for producing dressings has not had wide commercial usage although many attempts have been made to practice the same on a commercial basis. One of the major deterring factors has been the inability to introduce properly the inert gas into the mixture with the result that the end product has not been commercially satisfactory. This is due in large part to the fact that dressings of this character comprise delicate emulsion systems.

The principal object of this invention is to provide an improved method and apparatus for producing such dressings and more particularly for introducing the inert gas into the mixture in an improved manner as it is being transferred to the emulsifying apparatus for obtaining an improved and more uniform end product. If too little inert gas is introduced into the dressing, its characteristics are unfavorably altered and the keeping qualities are diminished, and if too much inert gas is introduced therein its characteristics are also unfavorably altered and the product will settle. If the introduction of the inert gas is not uniform in the continuous or semi-continuous process, the characteristics of the end product will not be uniform. In accordance with the method and apparatus of this invention correct amounts of inert gas are uniformly introduced in the mixture to provide an end product which is at all times uniform, which has most favorable characteristics and which is accomplished without adverse effect on the stability of the emulsion system.

Other objects and advantages of this invention will become apparent to those skilled in the art upon reference to the accompanying specification, claims and drawings in which:

Figure 1 is an illustration of an apparatus for producing salad dressing in accordance with this invention;

Figure 2 is a wiring diagram of the control means illustrated in Figure 1;

Figure 3 is an enlarged sectional view of a fitting for dispersing inert gas in the salad dressing mixture.

An apparatus for producing dressing such as salad dressing in accordance with this invention is illustrated in Figure 1. A pair of cookers 10 and 11 are provided with suitable heating means for cooking a starch base used as an ingredient in the salad dressing. The cookers 10 and 11 are also provided with agitating means for agitating the starch base as it is being cooked, these agitating means being driven by suitable drive members 12 and 13. The cooked starch base is withdrawn from the cookers 10 and 11 through valves 14 and 15 and a conduit 16 by means of a pump 17 driven by an electric motor 18 and is transferred to either cooler 20 or 21 under the control of a three way valve 19. The coolers 20 and 21 are provided with suitable cooling means for cooling the cooked starch base. The coolers are also provided with suitable agitators for agitating the starch base as it is being cooled and these agitators are driven by suitable drive means 22 and 23. The cooled starch base is then withdrawn from the coolers 20 and 21 through shut-off valves 24 and 25 and a conduit 26 by means of a pump 27 driven by an electric motor 28. The withdrawn starch base is directed by a three way valve 29 into either of two premixers 30 and 31. The other ingredients of the salad dressing are assembled with the starch base in the premixers 30 and 31 and are mixed together therein, the other ingredients including eggs, oil, vinegar and seasoning in the desired proportions. If mayonnaise is to be produced instead of salad dressing no starch base is required and, therefore, the cookers and coolers are eliminated. Here then, the ingredients of the mayonnaise dressing are assembled in the premixers 30 and 31, the mayonnaise ingredients including eggs, oil, vinegar and seasoning in the desired proportions.

The dressing mixture blended and premixed in the premixers 30 and 31 is withdrawn therefrom through shut-off valves 34 and 35 and a mixture conduit 36 by means of a pump 38 driven by an electric motor 39. A T-fitting 37 is interposed in the mixture conduit 36 up stream from the pump 38 as shown or down stream therefrom for introducing an inert gas into the flowing stream of the mixture in the mixture conduit 36. The combined mixture of the dressing mixture and the gas is delivered to an emulsifying apparatus such as a colloid mill 40 driven by an electric motor 41 wherein the combined mixture and gas are treated to complete the emulsion. The emulsified dressing is discharged from the colloid mill 40 through a conduit 42 into a container 43 which may be a hopper of a jar filling machine.

Two sets of cookers, coolers and premixers are preferably utilized so that the apparatus will produce the dressing in a substantially continuous manner. For example, while the starch base is being cooked in one of the cookers, the cooked starch base in the other cooker may be withdrawn therefrom and transferred to one of the coolers. At the same time the other cooler may be discharging cooled starch base into one of the premixers while the mixture is being withdrawn from the other premixer and being supplied to the emulsifier. This manipulation of the cookers, coolers and premixers to provide a substantially continuous process is afforded by the shut-off valves, the pumps and the three way valves. Of course, more cookers, coolers and premixers may be utilized if desired toward this end.

The inert gas, such as nitrogen, carbon dioxide or the like, may be supplied from suitable gas bottles 45 having a pressure regulating device 46 provided with gauges 47 and 48 for indicating the gas pressure within the bottles 45 and the gas pressure being delivered by the regulator 46. The inert gas is conducted by a gas conduit 49 from the pressure regulator 46 to the fitting 37 in the mixture conduit 36.

The fitting 37 for introducing the inert gas into the dressing mixture is illustrated in more detail in Figure 3. It is preferably a standard sanitary T-fitting having straight through legs 51 and 52 which are provided with screw threaded flanges for receiving nuts 53 and 54 for securing the fitting in the sanitary mixture conduit 36. The other leg 55 of the T-fitting is also provided with a screw threaded flange for receiving a nut 57 which clamps a plug 56 in place in this leg. The plug 56 is made in two parts; one part carrying the gas conduit 49 and the other part 58 being screw threaded thereto. A gasket 59 seals the junction between the two parts. The part 58 carries a porous disc 60 which is preferably made of stainless steel and the porous disc 60 is held in place by spinning over the end of the part 58 as indicated at 61. The inert gas supplied by the gas conduit 49 penetrates through the porous disc 60 and since the porous disc 60 is contacted by the flowing stream of the salad mixture the inert gas is uniformly and evenly dispersed in the salad mixture. Because the plug 56 is made of two parts it may be readily disassembled for cleaning purposes.

Referring again to Figure 1 a pressure responsive switch 64 is connected into the gas conduit 49 by a T-fitting 65 so that it responds to the gas pressure. This pressure responsive switch 64 includes a mercury switch 86 which is tilted to the "on" position or "closed" position when the gas pressure is within predetermined high and low limits and which is tilted to the "off" position or "open" position when the gas pressure rises above the high limit or falls below the low limit. These limits of the switch may be adjusted to desired values. In this respect the pressure regulator may be adjusted to supply gas at substantially 90 pounds per square inch and the high limit of the pressure responsive switch may be set at 100 pounds per square inch and the lower limit at 70 pounds per square inch. Also located in the gas conduit 49 down stream from the pressure responsive switch 64 is a flow meter 66 such as a Fischer and Porter Flowrator. This flow meter 66 operates to indicate the rate of flow of gas through the gas conduit 49. A three way valve 67 operated by a solenoid 68 is located in the gas conduit 49 up stream from the flow meter 66 and it controls a bypass connection around the flow meter 66, the bypass connection being indicated at 69. When the solenoid 68 is deenergized the three way valve 67 is operated to open the bypass connection 69 to apply gas pressure on the outlet side of the flow meter 66. When the solenoid 68 is energized, the three way valve 67 is operated to close the bypass connection 69 and to direct the flow of gas through the flow meter 66.

A shut-off valve 70 operated by a solenoid 71 is connected in the gas conduit 49 down stream from the flow meter 66. When the solenoid 71 is deenergized the shut-off valve 70 is closed, and when the solenoid is energized the shut-off valve is opened. Also located in the gas conduit 49 is a control valve 72 which is utilized for controlling the rate of flow of gas through the gas conduit 49. This control valve 72 is adjusted in accordance with the flow rates indicated by the flow meter 66 to maintain a desired rate of flow. The control valve 72 is shown to be down stream from the shut off valve 70, but it may be located in other places in the gas conduit 49 such as up stream from the pressure responsive switch 64. A lift type check valve 73 is also preferably located in the gas conduit 49 for preventing any salad mixture from entering the gas conduit, if it is inclined to do so.

A control means responsive to operation of the pump 38 and the operation of the pressure responsive switch 64 is utilized for controlling the solenoids 68 and 71 of the valves 67 and 70, respectively. This control means may include a panel 75 having suitable control switches and the like, indicating lamps 76 and 77, a relay 78, a relay 79 and a timer 80. The details of the control means and the wiring thereof are illustrated in the wiring diagram of Figure 2.

The pressure responsive switch means 64 operates the mercury switch 86 in the manner described above. The solenoid 68 includes an operating coil 87 and the solenoid 71 includes an operating coil 88. The relay 78 includes an operating coil 89 for operating a switch blade 90 with respect to contacts 91 and 92. When the operating coil 89 is deenergized, the switch blade 90 engages the contact 91 and when the operating coil 89 is energized the switch blade 90 engages the contact 92. This relay 78 controls the signal lamps 76 and 77, the signal lamp 76 preferably being red and the signal lamp 77 preferably being green. The relay 79 includes an operating coil 93 for operating a switch blade 94 with respect to a contact 95, the arrangement being such that when the operating coil 93 is energized the switch blade 94 engages the contact 95 and when it is deenergized, the switch blade 94 separates from the contact 95. The timer 80 includes an operating coil 96 for operating after a time interval a switch blade 97 with respect to a contact 98. The arrangement is such that when the operating coil 96 is energized for a predetermined time interval, say for example seven seconds, the switch blade 97 is moved into engagement with the contact 98. When the operating coil 96 is deenergized, the switch blade 97 is immediately moved out of engagement with the contact 98. This timer for operating in this manner may be of any desired construction and means are preferably provided for adjusting the time interval thereof.

The operating coil 93 of the relay 79 is connected by conductors 100 and 101 to the motor 39 which drives the pump 38 so that when the motor 39 is operated to drive the pump 38 the operating coil 93 is energized to close the switch means operated thereby. Power is supplied to the control means by conductors 102 and 103 leading from some source of power not shown. The switch means of the relay 79 and the mercury switch 86 of the pressure responsive device 64 are connected in series with the operating coil 89 of the relay 78 for controlling the operation thereof. When the motor 39 is operating to drive the pump 38 so as to energize the relay 79, and when the gas pressures are within the prescribed high and low values, a circuit is completed through the operating coil 89 of the relay 78, this circuit extending from line wire 102 through contact 95, switch blade 94, wires 104 and 106, mercury switch 86, wire 107, operating coil 89 and wire 105 back to the other line 103. When this occurs, the switch blade 90 of the relay 78 is moved into engagement with the contact 92 to complete a circuit through the green signal light 77, this circuit extending from the line wire 102 through switch contact 95, switch blade 94, wire 104, switch blade 90, contact 92, green signal light 77 and wire 105 back to the line wire 103. As a result the green signal light 77 indicates safe operation. If, however, the motor 39 driving the pump 38 is stopped, or, the gas pressure rises above the high limit or falls below the low limit, the circuit to the operating coil 89 of the relay 78 is deenergized whereupon the switch blade 90 moves into engagement with the contact 91. If the relay 79 is energized, a circuit is completed through the red signal light 76, the circuit being traced from the line wire 102 through contact 95, switch blade 94, conductor 104, switch blade 90, contact 91, red signal light 76 and conductor 105 back to the other line wire 103. Thus, when the motor 39 driving the pump 38 is not operating, the signal lights 76 and 77 are both extinguished for indicating this condition. If the motor 39 is operating, and the gas pressure is above the high value or below the low value, then the red signal light is illuminated for indicating this condition and if the gas pressure is within the prescribed high and low limits, then the green signal light 77 is illuminated for indicating this condition.

The switch means of the relay 79 and the mercury switch 86 of the pressure responsive device 64 are also connected in series with the operating coil 96 of the timer 80. Thus, when the motor 39 driving the pump 38 is operating and the gas pressure is within the prescribed limits, a circuit is completed from the line wire 102 through contact 95, switch blade 94, wires 104 and 106, mercury switch 86, wire 108, operating coil 96 and line wire 103 for energizing the operating coil 96. Following a predetermined time interval after energization of the operating coil 96, the switch blade 97 is moved into engagement with the contact 98 for energizing the solenoids 87 and 88. This energizing circuit extends from the line wire 102 through contact 95, switch blade 94, wires 104 and 106, mercury switch 86, wire 108, switch blade 97, contact 98, wire 109, through the operating coils 87 and 88 in parallel and wire 110 back to the other line wire 103. Under these conditions the solenoids 68 and 71 are then operated. If the motor 39 driving the pump 38 is stopped so as to deenergize the relay 79 or if the gas pressure rises above the high limit or falls below the low limit, this circuit is interrupted and the solenoids 68 and 71 are immediately deenergized.

For purposes of describing the operation of the apparatus of this invention it is assumed that the ingredients for the salad are premixed and blended in the premixer 30 and are ready for emulsifying. The pressure regulator 46 is then operated to supply gas to the gas conduit 49 at the desired pressure and when this is done the mercury switch 86 of the pressure responsive device 64 is closed. The solenoid operated shut-off valve 70 is closed and the three way valve 67 operated by the solenoid 68 is opened to the bypass connection 69 to apply gas pressure to the outlet side of the flow meter 66. The valve 34 on the outlet side of the premixer 30 is then opened and the motor 39 is operated for operating the pump 38 to withdraw the mixture from the premixer 30 through the mixture conduit 36 for delivering the same to the colloid mill 40. Immediately upon starting the motor 39 the timer 80 is then placed in operation and the green signal light 77 is illuminated. Following the predetermined time interval, the timer 80 then operates the solenoids 68 and 71 to close the three way valve 67 to the bypass connection 69 and direct the gas through the flow meter 66 and to open the shut-off valve 70. Gas is then supplied through the gas conduit 49, the flow meter 66 and the control valve 72 to the fitting 37 for introducing the gas into the mixture in the mixture conduit 36. Due to the time delay brought about by the timer, the gas is delivered to the fitting 37 at about the same time that the mixture is delivered thereto and the gas is delivered at the desired rate which is determined by the flow meter 66 and the control valve 72 and this is done without any surging. Because the gas had previously been placed on the outlet side of the flow meter 66 there is no surge of gas through the flow meter when the valve 70 is opened and the three way valve 67 is operated to supply gas to the flow meter. In this way surging of the gas is entirely prevented which prevents surging of the flow meter 66 and eliminates possible breakage thereof and which prevents delivering excess gas to the fitting 37. The control valve 72 operating in conjunction with the flow meter 66 operates to regulate the rate of flow of the gas to the fitting 37 and to maintain the rate of flow substantially constant at the desired value. Since the rate of flow of the mixture through the mixture conduit 36 is also substantially constant, the correct proportions of gas are uniformly dispersed into the mixture. Preferably, the amount of gas so dispersed into the mixture is three to five percent by volume. The combined mixture and gas are treated in the colloid mill 40 for completing the emulsion which is then delivered into the container 43.

If the gas pressure should fall below the low limit so that sufficient gas would not be supplied to the fitting 37 then the pressure responsive switch 64 operates to close the valve 70 and open the three way valve 67 to the bypass connection 69. This shuts off the flow of gas through the gas conduit 49. At the same time the green signal light 77 is extinguished and the red signal light 76 is illuminated to show this condition whereupon the operator of the apparatus shuts off the motor 39 and stops operation of the pump 38. If during operation the pump 38 should be stopped, the relay 79 is deenergized and this immediately operates to close the valve 70 and open the three way valve 67 to the bypass connection 69. Under these conditions, therefore, the flow of gas is immediately stopped and both signal lights 76 and 77 are extinguished to indicate this condition.

While for purposes of illustration one form of this invention has been disclosed other forms thereof may become apparent to those skilled in the art upon reference to this disclosure and, therefore, this invention is to be limited only by the scope of the appended claims.

We claim as our invention:

1. In an apparatus for producing a dressing including a container in which the usual required ingredients are assembled and premixed, and emulsifying apparatus, means including a pump and a mixture conduit extending between the container and the emulsifying apparatus for withdrawing the mixture from the container and transferring the same at a substantially constant rate in a flowing stream to the emulsifying apparatus, a source of inert gas, and means including a gas conduit connecting the source of inert gas to the mixture conduit for introducing the gas into the flowing stream of the mixture whereby the combined mixture and gas are treated in the emulsifier apparatus to complete the emulsion, the improvement consisting of, a flow meter in the gas conduit for measuring the rate of flow of the inert gas, and a control valve in the gas conduit for regulating the rate of flow of the inert gas to introduce the same into the mixture at a substantially constant desired rate, a shut off valve in the gas conduit downstream from the flow meter, a bypass connection around the flow meter, a three way valve in the gas conduit upstream from the flow meter and controlling the bypass connection, and control means operatively connected with said pump, shut off valve and three way valve for closing the shut off valve and opening the three way valve to the bypass connection for applying gas to the outlet side of the flow meter when the pump is not operating and including timing means for opening the shut off valve and closing the three way valve to the bypass connection a predetermined time after the pump is started to prevent surging of the flow meter and to introduce the gas into the mixture at substantially the constant desired rate without substantial surging.

2. In an apparatus for producing a dressing including a container in which the usual required ingredients are assembled and premixed, an emulsifying apparatus, means including a pump and a mixture conduit extending between the container and the emulsifying apparatus for withdrawing the mixture from the container and transferring the same at a substantially constant rate in a flowing stream to the emulsifying apparatus, a source of inert gas, and means including a gas conduit connecting the source of inert gas to the mixture conduit for introducing the gas into the flowing stream of the mixture whereby the combined mixture and gas are treated in the emulsifier apparatus to complete the emulsion, the improvement consisting of, a T-fitting having its straight through legs connected in the mixture conduit, an apertured plug connected in the other leg of the T-fitting and connected to the gas conduit, and a porous disc secured in the plug and contacted by the mixture and passing the gas for uniformly dispersing the gas in the mixture, a flow meter in the gas conduit for measuring the rate of flow of the inert gas, and a control valve in the gas conduit for regulating the rate of flow of the inert gas to introduce the same into the mixture at a substantially constant desired rate, a shut off valve in the gas conduit downstream from the flow meter, a bypass connection around the flow meter, a three way valve in the gas conduit upstream from the flow meter and controlling the bypass connection, and control means operatively connected with said pump, shut off valve and three way valve for closing the shut off valve and opening the three way valve to the bypass connection for applying gas to the outlet side of the flow meter when the pump is not operating and including timing means for opening the shut off valve and closing the three way valve to the bypass connection a predetermined time after the pump is started to prevent surging of the flow meter and to introduce the gas into the mixture at substantially the constant desired rate without substantial surging.

3. In an apparatus for producing a dressing including a container in which the usual required ingredients are assembled and premixed, an emulsifying apparatus, means including a pump and a mixture conduit extending between the container and the emulsifying apparatus for withdrawing the mixture from the container and transferring the same at a substantially constant rate in a flowing stream to the emulsifying apparatus, a source of inert gas, and means including a gas conduit connecting the source of inert gas to the mixture conduit for introducing the gas into the flowing stream of the mixture whereby the combined mixture and gas are treated in the emulsifier apparatus to complete the emulsion, the improvement consisting of, a flow meter in the gas conduit for measuring the rate of flow of the inert gas, and a control valve in the gas conduit for regulating the rate of flow of the inert gas to introduce the same into the mixture at a substantially constant desired rate, a solenoid shut off valve in the gas conduit downstream from the flow meter and normally closing the same, a bypass connection around the flow meter, a solenoid three way valve in the gas conduit upstream from the flow meter and controlling the bypass connection and normally opening the bypass connection, a timer including an operating coil and switch means which are closed a predetermined time after energizing the operating coil, electrical connections connecting the solenoid shut off valve and the solenoid three way valve to the switch means of the timer, a relay including an operating coil and switch means which are closed upon energizing the operating coil, electrical connections connecting the switch means of the relay to the operating coil of the timer, and electrical connections controlled by the pump for energizing the operating coil of the relay when the pump is operating, the arrangement being such that the solenoid shut off valve is closed and the solenoid three way valve is opened to the bypass connection for applying gas to the outlet side of the flow meter when the pump is not operating and that the solenoid shut off valve is opened and the solenoid three way valve is closed to the bypass connection a predetermined time after the pump is started to prevent surging of the flow meter and to introduce the gas into the mixture at substantially the constant desired rate without substantial surging.

4. In an apparatus for producing a dressing including a container in which the usual required ingredients are assembled and premixed, an emulsifying apparatus, means including a pump and a mixture conduit extending between the container and the emulsifying apparatus for withdrawing the mixture from the container and transferring the same at a substantially constant rate in a flowing stream to the emulsifying apparatus, a source of inert gas, and means including a gas conduit connecting the source of inert gas to the mixture conduit for introducing the gas into the flowing stream of the mixture whereby the combined mixture and gas are treated in the emulsifier apparatus to complete the emulsion, the improvement consisting of, a flow meter in the gas conduit for measuring the rate of flow of the inert gas, and a control valve in the gas conduit for regulating the rate of flow of the inert gas to introduce the same into the mixture at a substantially constant desired rate, a shut off valve in the gas conduit downstream from the flow meter, a bypass connection around the flow meter, a three way valve in the gas conduit upstream from the flow meter and controlling the bypass connection, pressure responsive means responsive to the pressure of the inert gas supplied to the gas conduit, and control means operatively connected with said pressure rsponsive means, shut off valve and three way valve for closing the shut off valve and opening the three way valve to the bypass connection for applying gas to the outlet side of the flow meter when the gas pressure is above or below predetermined high and low values and including timing means for opening the shut off valve and closing the three way valve to the bypass connection a predetermined time after the gas pressure is within the predetermined high and low values to prevent surging of the flow meter and to introduce gas into the mixture at substantially the constant desired rate without substantial surging.

5. In an apparatus for producing a dressing including a container in which the usual required ingredients are assembled and premixed, an emulsifying apparatus, means including a pump and a mixture conduit extending between the container and the emulsifying apparatus for withdrawing the mixture from the container and transferring the same at a substantially constant rate in a flowing stream to the emulsifying apparatus, a source of inert gas, and means including a gas conduit connecting the source of inert gas to the mixture conduit for introducing the gas into the flowing stream of the mixture whereby the combined mixture and gas are treated in the emulsifier apparatus to complete the emulsion, the improvement consisting of, a flow meter in the gas conduit for measuring the rate of flow of the inert gas, and a control valve in the gas conduit for regulating the rate of flow of the inert gas to introduce the same into the mixture at a substantially constant desired rate, a solenoid shut off valve in the gas conduit downstream from the flow meter and normally closing the same, a bypass connection around the flow meter, a solenoid three way valve in the gas conduit upstream from the flow meter and controlling the bypass connection and normally opening the bypass connection, a timer including an operating coil and switch means which are closed a predetermined time after energizing the operating coil, electrical connections connecting the solenoid shut off valve and the solenoid three way valve to the switch means of the timer, pressure responsive switch means responsive to the pressure of the inert gas supplied to the gas conduit and which opened when the gas pressure is above or below predetermined high and low values and closed when the gas pressure is within said predetermined high and low values, and electrical connections connecting the pressure responsive switch means to the operating coil of the timer, the arrangement being such that the solenoid shut off valve is closed and the solenoid three way valve is opened to the bypass connection for applying gas to the outlet side of the flow meter when the gas pressure is above or below the predetermined high and low values and that the solenoid shut off valve is opened and the solenoid three way valve is closed to the bypass connection a predetermined time after the gas pressure is within the predetermined high and low values to prevent surging of the flow meter and to introduce gas into the mixture at substantially the constant desired rate without substantial surging.

6. In an apparatus for producing a dressing including a container in which the usual required ingredients are assembled and premixed, an emulsifying apparatus, means including a pump and a mixture conduit extending between the container and the emulsifying apparatus for withdrawing the mixture from the container and transferring the same at a substantially constant rate in a flowing stream to the emulsifying apparatus, a source of inert gas, and means including a gas conduit connecting the source of inert gas to the mixture conduit for introducing the gas into the flowing stream of the mixture whereby the combined mixture and gas are treated in the emulsifier apparatus to complete the emulsion, the improvement consisting of a T-fitting having its straight through legs connected in the mixture conduit, an apertured plug connected in the other leg of the T-fitting and connected to the gas conduit, and a porous disc secured in the plug and contacted by the mixture and passing the gas for uniformly dispersing the gas in the mixture, a flow meter in the gas conduit for measuring the rate of flow of the inert gas, and a control valve in the gas conduit for regulating the rate of flow of the inert gas to introduce the same into the mixture at a substantially constant desired rate, a shut off valve in the gas conduit downstream from the flow meter, a bypass connection around the flow meter, a three way valve in the gas conduit upstream from the flow meter and controlling the bypass connection, pressure responsive means responsive to the pressure of the inert gas supplied to the gas conduit, and control means operatively connected with said pressure responsive means, shut off valve and three way valve for closing the shut off valve and opening the three way valve to the bypass connection for applying gas to the outlet side of the flow meter when the gas pressure is above or below predetermined high and low values and including timing means for opening the shut off valve and closing the threeway valve to the bypass connection a predetermined time after the gas pressure is within the predetermined high and low values to prevent surging of the flow meter and to introduce gas into the mixture at substantially the constant desired rate without substantial surging.

7. In an apparatus for producing a dressing including a container in which the usual required ingredients are assembled and premixed, an emulsifying apparatus, means including a pump and a mixture conduit extending between the container and the emulsifying apparatus for withdrawing the mixture from the container and transferring the same at a substantially constant rate in a flowing stream to the emulsifying apparatus, a source of inert gas, and means including a gas conduit connecting the source of inert gas to the mixture conduit for introducing the gas into the flowing stream of the mixture whereby the combined mixture and gas are treated in the emulsifier apparatus to complete the emulsion, the improvement consisting of, a flow meter in the gas conduit for measuring the rate of flow of the inert gas, and a control valve in the gas conduit for regulating the rate of flow of the inert gas to introduce the same into the mixture at a substantially constant desired rate, a shut off valve in the gas conduit downstream from the flow meter, a bypass connection around the flow meter, a three way valve in the gas conduit upstream from the flow meter and controlling the bypass connection, pressure responsive means responsive to the pressure of the inert gas supplied to the gas conduit, and control means operatively connected with said pump, pressure responsive means, shut off valve and three way valve for closing the shut off valve and opening the three way valve to the bypass connection for applying gas to the outlet side of the flow meter when the pump is not operating or when the gas pressure is above or below predetermined high and low values and including timing means for opening the shut off valve and closing the three way valve to the bypass connection a predetermined time after both the pump is started and the gas pressure is within the predetermined high and low values to prevent surging of the flow meter and to introduce gas into the mixture at substantially the constant desired rate without substantial surging.

8. In an apparatus for producing a dressing including a container in which the usual required ingredients are assembled and premixed, an emulsifying apparatus, means including a pump and a mixture conduit extending between the container and the emulsifying apparatus for withdrawing the mixture from the container and transferring the same at a substantially constant rate in a flowing stream to the emulsifying apparatus, a source of inert gas, and means including a gas conduit connecting the source of inert gas to the mixture conduit for introducing the gas into the flowing stream of the mixture whereby the combined mixture and gas are treated in the emulsifier apparatus to complete the emulsion, the improvement consisting of, a T-fitting having its straight through legs connected in the mixture conduit, an apertured plug connected in the other leg of the T-fitting and connected to the gas conduit, and a porous disc secured in the plug and contacted by the mixture and passing the gas for uniformly dispersing the gas in the mixture, a flow meter in the gas conduit for measuring the rate of flow of the inert gas, and a control valve in the gas conduit for regulating the rate of flow of the inert gas to introduce the same into the mixture at a substantially constant desired rate, a shut off valve in the gas conduit downstream from the flow meter, a bypass connection around the flow meter, a three way valve in the gas conduit upstream from the flow meter and controlling the bypass connection, pressure responsive means responsive to the pressure of the inert gas supplied to the gas conduit, and control means operatively connected with said pump, pressure responsive means, shut off valve and three way valve for closing the shut off valve and opening the three way valve to the bypass connection for applying gas to the outlet side of the flow meter when the pump is not operating or when the gas pressure is above or below predetermined high and low values and including timing means for opening the shut off valve and closing the three way valve to the bypass connection a predetermined time after both the pump is started and the gas pressure is within the predetermined high and low values to prevent surging of the flow meter and to introduce gas into the mixture at substantially the constant desired rate without substantial surging.

9. In an apparatus for producing a dressing including a container in which the usual required ingredients are assembled and premixed, an emulsifying apparatus, means including a pump and a mixture conduit extending between the container and the emulsifying apparatus for withdrawing the mixture from the container and transferring the same at a substantially constant rate in a flowing stream to the emulsifying apparatus, a source of inert gas, and means including a gas conduit connecting the source of inert gas to the mixture conduit for introducing the gas into the flowing stream of the mixture whereby the combined mixture and gas are treated in the emulsifier apparatus to complete the emulsion, the improvement consisting of, a flow meter in the gas conduit for measuring the rate of flow of the inert gas, and a control valve in the gas conduit for regulating the rate of flow of the inert gas to introduce the same into the mixture at a substantially constant desired rate, a solenoid shut off valve in the gas conduit downstream from the flow meter and normally closing the same, a bypass connection around the flow meter, a solenoid three way valve in the gas conduit upstream from the flow meter and controlling the bypass connection and normally opening the bypass connection, a timer including an operating coil and switch means which are closed a predetermined time after energizing the operating coil, electrical connections connecting the solenoid shut off valve and the solenoid three way valve to the switch means of the timer, a relay including an operating coil and switch means which are closed upon energizing the operating coil, and electrical connections controlled by the pump for energizing the operating coil of the relay when the pump is operating, pressure responsive switch means responsive to the pressure of the inert gas supplied to the gas conduit and which opened when the gas pressure is above or below predetermined high and low values and closed when the gas pressure is within said predetermined high and low values, and electrical connections connecting the switch means of the relay and the pressure responsive switch means in series to the operating coil of the timer, the arrangement being such that the solenoid shut off valve is closed and the solenoid three way valve is opened to the bypass connection for applying gas to the outlet side of the flow meter when the pump is not operating or when the gas pressure is above or below the predetermined high and low values and that the solenoid shut off valve is opened and the solenoid three way valve is closed to the bypass connection a predetermined time after both the pump is started and the gas pressure is within the predetermined high and low values to prevent surging of the flow meter and to introduce gas into the mixture at substantially the constant desired rate without substantial surging.

10. In an apparatus for producing a dressing including a container in which the usual required ingredients are assembled and premixed, an emulsifying apparatus, means including a pump and a mixture conduit extending between the container and the emulsifying apparatus for withdrawing the mixture from the container and transferring the same at a substantially constant rate in a flowing stream to the emulsifying apparatus, a source of inert gas, and means including a gas conduit connecting the source of inert gas to the mixture conduit for introducing the gas into the flowing stream of the mixture whereby the combined mixture and gas are treated in the emulsifier apparatus to complete the emulsion, the improvement consisting of, a flow meter in the gas conduit for measuring the rate of flow of the inert gas, and a control valve in the gas conduit for regulating the rate of flow of the inert gas to introduce the same into the mixture at a substantially constant desired rate, a shut off valve in the gas conduit downstream from the flow meter, a bypass connection around the flow meter, a three way valve in the gas conduit upstream from the flow meter and controlling the bypass connection, pressure responsive means responsive to the pressure of the inert gas supplied to the gas conduit, and control means operatively connected with said pressure responsive means, shut off valve and three way valve for closing the shut off valve and opening the three way valve to the bypass connection for applying gas to the outlet side of the flow meter when the gas pressure is above or below predetermined high and low values and including timing means for opening the shut off valve and closing the three way valve to the bypass connection a predetermined time after the gas pressure is within the predetermined high and low values to prevent surging of the flow meter and to introduce gas into the mixture at substantially the constant desired rate without substantial surging, signal means, and means operatively connected with said pressure responsive means and said signal means for operating said signal means to indicate whether or not the gas pressure is within the predetermined high and low values.

11. In an apparatus for producing a dressing including a container in which the usual required ingredients are assembled and premixed, an emulsifying apparatus, means including a pump and a mixture conduit extending between the container and the emulsifying apparatus for withdrawing the mixture from the container and transferring the same at a substantially constant rate in a flowing stream to the emulsifying apparatus, a source of inert gas, and means including a gas conduit connecting the source of inert gas to the mixture conduit for introducing the gas into the flowing stream of the mixture whereby the combined mixture and gas are treated in the emulsifier apparatus to complete the emulsion, the improvement consisting of, a flow meter in the gas conduit for measuring the rate of flow of the inert gas, and a control valve in the gas conduit for regulating the rate of flow of the inert gas to introduce the same into the mixture at a substantially constant desired rate, a shut off valve in the gas conduit downstream from the flow meter, a bypass connection around the flow meter, a three way valve in the gas conduit upstream from the flow meter and controlling the bypass connection, pressure responsive means responsive to the pressure of the inert gas supplied to the gas conduit, and control means operatively connected with said pump, pressure responsive means, shut off valve and three way valve for closing the shut off valve and opening the three way valve to the bypass connection for applying gas to the outlet side of the flow meter when the pump is not operating or when the gas pressure is above or below predetermined high and low values and including timing means for opening the shut off valve and closing the three way valve to the bypass connection a predetermined time after both the pump is started and the gas pressure is within the predetermined high and low values to prevent surging of the flow meter and to introduce gas into the mixture at substantially the constant desired rate without substantial surging, signal means, and means operatively connected with said control means and said signal means for operating said signal means to indicate whether or not said pump is operating and whether or not the gas pressure is within the predetermined high and low values.

References Cited in the file of this patent

UNITED STATES PATENTS

| | | |
|---|---|---|
| 1,949,791 | Epstein et al. | Mar. 6, 1934 |
| 1,971,852 | Goebels | Aug. 28, 1934 |
| 2,015,056 | Barnes | Sept. 24, 1935 |
| 2,024,479 | Short | Dec. 17, 1935 |
| 2,203,980 | Burt | June 11, 1940 |
| 2,627,394 | Spencer | Feb. 3, 1953 |